(12) United States Patent
Le Berre

(10) Patent No.: US 7,051,350 B1
(45) Date of Patent: *May 23, 2006

(54) METHOD OF OPERATING AN APPARATUS INTENDED TO PERMIT ACCESS TO SERVICES

(75) Inventor: Jacques Le Berre, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1131 days.

This patent is subject to a terminal disclaimer.

(21) Appl. No.: 09/712,679

(22) Filed: Nov. 14, 2000

Related U.S. Application Data

(63) Continuation of application No. 08/895,467, filed on Jul. 16, 1997, now Pat. No. 6,185,735.

(30) Foreign Application Priority Data

Jul. 17, 1996 (FR) .................................. 96 08954

(51) Int. Cl.
 H04N 7/16 (2006.01)
 H04N 7/10 (2006.01)
(52) U.S. Cl. .............................. 725/5; 725/25; 455/406
(58) Field of Classification Search ............... 725/5, 725/25; 455/2, 6.2, 6.3; 380/5, 10, 20; 705/44, 705/26; H04N 7/00, 7/15, 7/20
See application file for complete search history.

(56) References Cited

U.S. PATENT DOCUMENTS

| | | | |
|---|---|---|---|
| 4,115,662 A | 9/1978 | Guinet et al. | 179/15 |
| 4,797,918 A | 1/1989 | Lee et al. | 380/20 |
| 5,287,181 A | 2/1994 | Holman | 348/473 |
| 5,488,423 A | 1/1996 | Walkingshaw et al. | 348/460 |
| 5,572,571 A * | 11/1996 | Shirai | 455/551 |
| 5,604,528 A | 2/1997 | Edwards et al. | 348/5.5 |

* cited by examiner

Primary Examiner—Vivek Srivastava

(57) ABSTRACT

Certain providers, notably of television programs, subsidize the receivers and want to avoid that these apparatuses can also be used for the services offered by other providers. On the other hand, manufacturers of these apparatuses prefer selling multipurpose apparatuses and users do not want to have several similar apparatuses, which, moreover, is cumbersome. To obtain a compromise between these contradictory requirements, it is proposed to permit reception by the apparatus of services offered by a provider other than the provider who has subsidized the apparatus, when the subscription taken out by said provider has reached a certain period or length of service.

3 Claims, 2 Drawing Sheets

METHOD OF OPERATING AN APPARATUS INTENDED TO PERMIT ACCESS TO SERVICES

CROSS REFERENCE TO RELATED APPLICATIONS

This is a continuation of application Ser. No. 08/895,467, filed Jul. 16, 1997.

The invention relates to a method of operating an apparatus intended to permit access to services provided on subscription by a first provider, which method enables access to services offered by a second provider.

The invention also relates to an apparatus provided with means intended to permit access to services provided on subscription by a first provider, which apparatus enables access to services offered by a second provider.

To develop the market for receivers/decoders enabling access to pay-TV programs, the providers of these programs want the price of these apparatuses to be as low as possible for the user. To obtain an artificially low price, certain providers either offer a subsidy on the purchase of these apparatuses, or buy them themselves so as to offer them for hire. In either case, they want their investments to produce profits by preventing an apparatus subsidized by a first provider from receiving programs supplied by a second provider, and to this end, certain receiver/decoders are provided with means for verifying whether the provider of a program which a subscriber wants to receive is the provider who has let or owns the apparatus. On the other hand, manufacturers of apparatuses prefer selling multipurpose apparatuses and users do not want to be obliged to be furnished with several apparatuses of the same type, which is expensive and cumbersome: an apparatus based on the use of several smart cards for television programs offered by several providers is known from the document EP 0 562 295 in which several card readers are connected and controlled by a single processor.

The same kind of problem is likely to occur in mobile telephony ("GSM").

It is an object of the invention to provide a solution eliminating the contradiction between the providers and users' wishes.

To this end, access to services offered by a second provider is refused by the apparatus, except when the subscription taken out by the first provider has a certain period or length of service.

In this way, a compromise is obtained between the contradictory requirements stated above.

In a preferred embodiment of the method, the apparatus, making use of scrambled communication, verifies two conditions, namely, on the one hand, if the scrambling method is the same for the two providers and, on the other hand, if the period of the subscription taken out by the first provider exceeds a given period of time, and authorizes access to services offered by the second provider if these two conditions are satisfied.

Advantageously, the date of first use of the subscription is automatically registered by the apparatus when it is put into use for the first time.

An apparatus according to the invention is provided with control means for authorizing or prohibiting access to services offered by a second provider, means for computing the difference between the date of first use of the subscription taken out by the first provider and the current date, and the control means are arranged to authorize access to services offered by the second provider if said difference between the dates exceeds a given value.

This apparatus is advantageously provided with means for automatically registering the date of first use of the subscription when the apparatus is put into use for the first time, and means for delivering a warning message when the subscription period is not sufficient to authorize access to certain services.

These and other aspects of the invention are apparent from and will be elucidated with reference to the embodiments described hereinafter.

The following description is based on the embodiment of a television receiver/decoder, but the elements relating to access authorization may be alternatively used as such for access control of any other type of apparatus.

Figure 1:
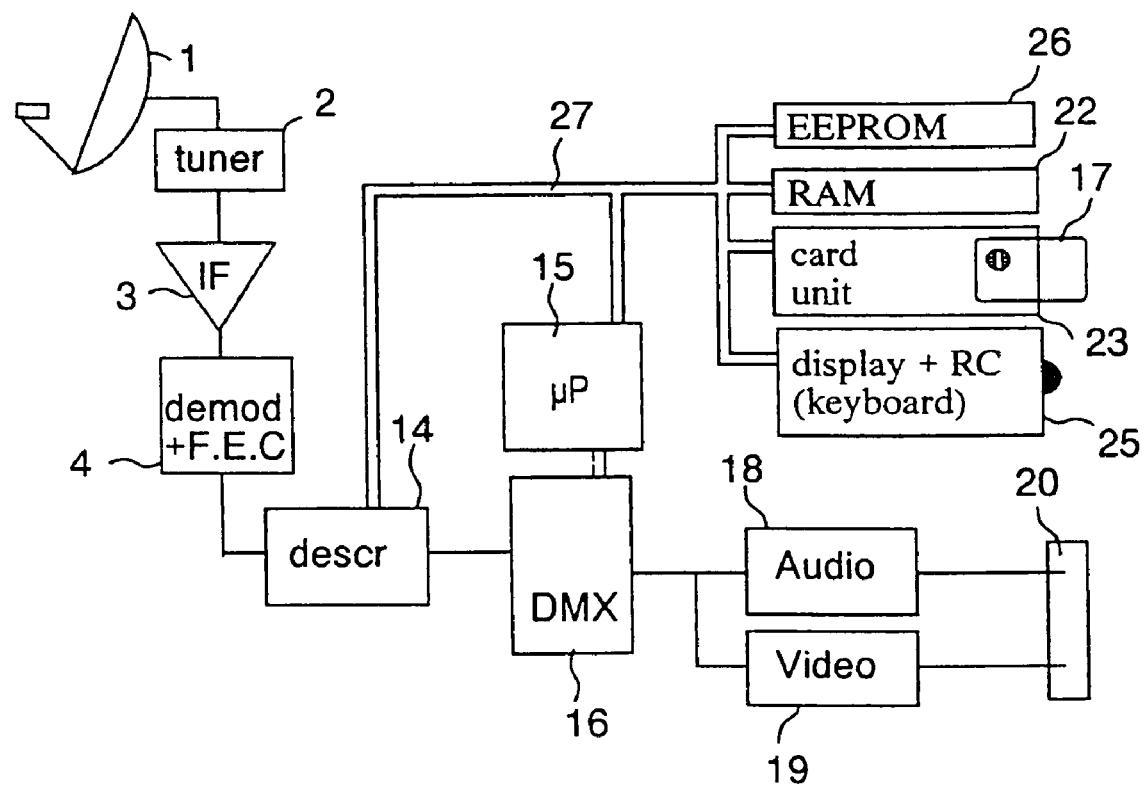
FIG. 1 shows diagrammatically a television receiver/decoder.

The receiver/decoder shown in FIG. 1 is intended to allow access on subscription to at least one block of television programs coded in accordance with the MPEG2 standard. It will be evident that the invention may be alternatively applied to apparatuses adapted to another standard.

The apparatus comprises a satellite reception unit constituted by a parabolic antenna 1 and a tuner 2, and followed by an IF amplifier 3. The IF signal is subsequently demodulated and certain errors are corrected in a module 4. At this level, the signal is descrambled in a descrambling module 14 connected via a bus 27 to a unit 23 for reading a microprocessor card 17, referred to as chip card, and to a microprocessor 15. The microprocessor 15 comprises a read-only memory in which the basic instructions are stored. It is associated with a random-access memory 22 for instantaneous data, a memory 26 of the EEPROM type for storing semipermanent program elements, i.e. elements which can be preserved when the apparatus is switched off but which can also be updated, and with a card reader 23, a keyboard and/or a remote control receiver 25 connected to a data display screen. The descrambled signal is submitted to the influence of a demultiplexer 16 connected to the microprocessor 15 which separates the different programs from each other. The signal supplied by this demultiplexer has a digital form and must be transformed into an analog signal for displaying an image on a screen and for applying the sound to a loudspeaker. This transformation is effected in a video decoder 19 and an audio decoder 18. These decoders are connected to a connector 20, for example, for connection to a conventional television set.

The card unit 23 for reading the chip card 17 is to be used for reading the information required to descramble the television broadcasts in known manner. The card contains information such as a distribution key, a provider's reference, characteristic features of a subscription to a block of programs transmitted by a provider, and the scrambling type.

The microprocessor 15 is provided with a software element for automatically registering the date of first use of the subscription when the card is inserted into the apparatus for the first time.

Figure 2:
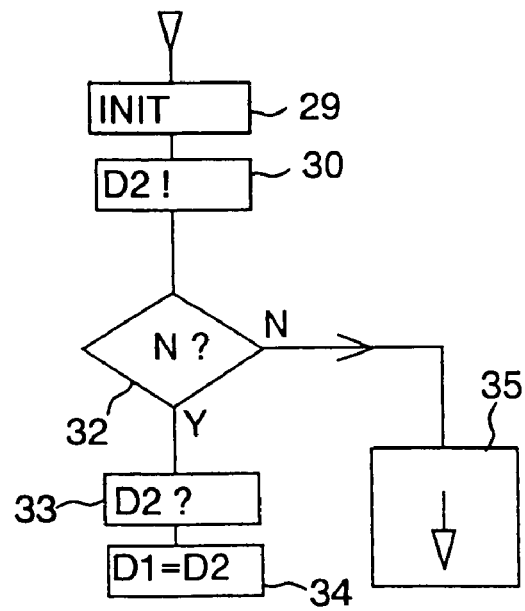
FIG. 2 is a diagram illustrating how the date of first use is registered.

A diagram illustrating the part relating to this software is shown in FIG. 2. Whenever the apparatus is put into use, a program is automatically executed. This program configures the microprocessor and positions certain variables in an initialization step 29. At 30, the date of the day D2, which is received by the apparatus in a coded form from any transmitter, is registered in the memory 22. At 32, it is verified whether the apparatus is put into use for the first time. Several known methods may be used for this purpose. For example, during manufacture of the apparatus, a flag is positioned in the EEPROM memory to indicate that the apparatus has never been used: it is sufficient to test this flag. Another method is to verify whether a memory field D1, which normally comprises the starting date of the subscription taken out by the provider who has subsidized the apparatus, is empty, which is the case before the first time of use. If the first time of use is concerned (Y), the process proceeds to 33 where the date D2 of the day is read into the memory 22, and subsequently to 34 where this date of the day D2 is written in the field D1 of memory 26. If the first time of use is not concerned (N), the process proceeds to 35 for effecting other operations which do not relate to the invention.

The microprocessor 15 also comprises control software for authorizing reception of a program according to which the provider of the program which the subscriber wants to receive is or is not the one who has subsidized the apparatus. This software comprises means for evaluating the subscription period by computing the difference between the date of first use of the subscription and the current date, obtained by reception of a program. It authorizes the reception of the requested program if the subscription period exceeds a given period of time, even in the case where the provider is not the one who has subsidized the apparatus. The necessary subscription period may be, for example, six months or any other longer or shorter period based on the provider's policy and on the value of the initially granted subsidy. It should be noted that the types of scrambling methods used by the two providers must be compatible.

Figure 3:
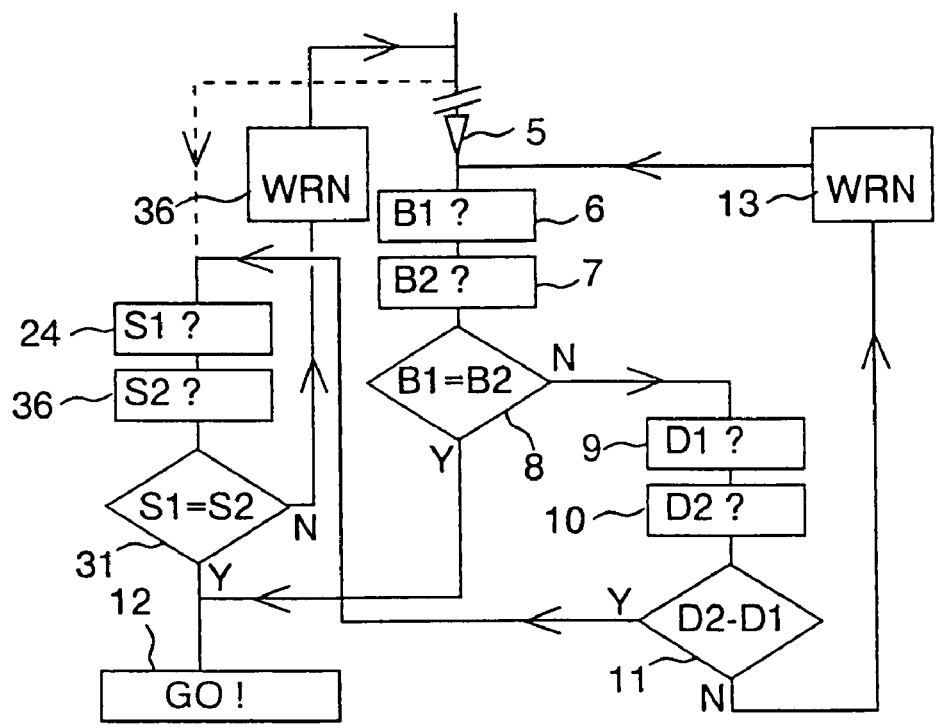
FIG. 3 is a diagram illustrating the operation of the control and computing means.

A diagram illustrating the part relating to this software is shown in FIG. 3. The software input is denoted by the reference numeral 5 (the part cut off above the input 5 will be explained hereinafter). At 6, the reference B1 of the provider who has subsidized the apparatus is read, for example in the read-only memory. At 7, the reference B2 of the provider of the program which the user wants to watch is read from card 17 by the card reader 23, because one card corresponds to each program provider, or, in the case where several cards are placed in advance in a multicard reader (not shown), the reference would be read from the memory 22, with the information then being given by a user command via the keyboard or the remote control receiver 25, the code of which command is stored in the memory 22. At 8, a comparison is made between the two references B1 and B2. If they correspond (Y), there is no problem and the process proceeds to 12 for authorizing the operation of the known receiver/decoder. If the two providers B1 and B2 are different (N), the process proceeds to 9 where the starting date D1 of the subscription taken out by the provider who has subsidized the apparatus is read from the memory 26. At 10, the date D2 of the day is read from the memory 22. At 11, the difference between the dates D1 and D2 is computed and compared with a predetermined value. If this difference is sufficient (Y), the process proceeds to 24 where the scrambling type S1 used by the first provider is determined, subsequently to 36 where the scrambling type S2 used by the second provider is determined; at 31, it is verified whether these two scrambling types are the same and, if this is the case, the process proceeds to 12. If, at 11, the subscription is judged to be very recent (N), the process delivers, in a step 13, a warning message indicating that the subscription period is not sufficient to authorize reception of the program, and subsequently returns to the start. It will be clear that the steps 6, 7, 8, on the one hand, and the steps 9, 10, 11, on the other hand, may be interchanged without modifying the result obtained. In other words, it does not make any difference to verify the identity of the two providers first and then the subscription period, or conversely; nevertheless, in many cases, the user will only use a card of the first provider and it is preferable to start from step 8 so as to avoid useless tests. It is alternatively possible to carry out an auto-programming procedure, namely, if the test step at 8 shows that the subscription has expired, given the fact that this information is definitive, the program may be modified in an irreversible manner by cutting off the access to the input 5 (part cut off above the input 5), so as to arrive directly at 24 via the line indicated as a broken line. Those skilled in the art may easily render this software more complicated by introducing means for verifying a password so as to prevent unauthorized persons from falsifying the software with the intention of extending the date D1 or eliminating the test procedure.

What is claimed is:

1. A method of operating apparatus comprising the steps of:
    permitting access to services provided on subscription by a first provider; and
    preventing access to services provided on subscription by a second provider until after the subscription from the first provider is put into use for the first time and after the subscription has continued to be used until a later different second time.

2. The method of claim 1 in which access is prevented by scrambled communication, and permitted by unscrambling the communication, and access to services of the second provider is prevented unless the scrambling method is the same for the first and second providers.

3. The method of claim 1, in which the date of first use of the subscription is automatically registered by the apparatus when it is put into use for the first time.

* * * * *